Nov. 4, 1952      F. M. TOMLINSON      2,616,158
MACHINE TOOL

Filed March 6, 1947      5 Sheets-Sheet 1

INVENTOR.
Fay M. Tomlinson
BY
Kwis, Hudson, Boughton & Williams
ATTORNEYS

Nov. 4, 1952     F. M. TOMLINSON     2,616,158

MACHINE TOOL

Filed March 6, 1947     5 Sheets-Sheet 2

INVENTOR.
Fay M. Tomlinson
BY
Kwis, Hudson, Broughton & Williams
ATTORNEYS

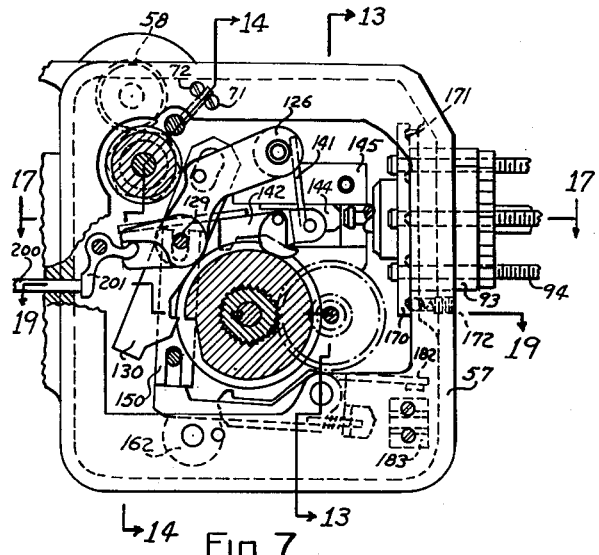

INVENTOR.
Fay M. Tomlinson
BY
Kwis, Hudson, Boughton & Williams
ATTORNEYS

Patented Nov. 4, 1952

2,616,158

UNITED STATES PATENT OFFICE 2,616,158

MACHINE TOOL

Fay M. Tomlinson, Lakewood, Ohio, assignor to The Warner & Swasey Company, Cleveland, Ohio, a corporation of Ohio Application March 6, 1947, Serial No. 732,912

23 Claims. (Cl. 29—64)

This invention relates to a machine tool and particularly to an improved automatic stop means for a movable tool supporting member of a machine tool.

An object of the invention is to provide a machine tool with a novel and improved stop mechanism comprising a unitary structure carried by a movable member of the machine for automatically stopping the movement of the member at selected, predetermined positions thereof.

Another object of the invention is to provide a turret type machine tool with a novel and improved stop mechanism comprising a compact unitary structure carried by the turret slide and selectively conditioned by indexing of the turret to automatically stop the movement of the slide at various predetermined locations thereof, each corresponding to the predetermined limit of movement of the slide for that face of the turret which has been indexed into operative position with respect to a workpiece.

A further object of the invention is to provide a machine tool, having a movable and indexible member provided with a plurality of tool supporting faces, with a novel and improved unitary stop mechanism adapted to be carried by said member and comprising positionable means operatively connected with the movable member to be automatically selectively positioned by indexing of said member to thereby selectively condition said mechanism for effecting stopping of the movement of said member at various predetermined locations thereof, each corresponding to a predetermined limit of movement of the member for an indexed face thereof; said mechanism further comprising manual means for disconnecting the operative connection between said positionable means and said movable member and manually positioning said positionable means to condition said mechanism for effecting stopping of said member at a predetermined limit of movement thereof corresponding to any face of said member or to a corner thereof intermediate any two adjacent faces.

A still further object of the invention is to provide a machine tool having means for moving a tool supporting member at a feed rate and means including a rapid motion lever for moving the member at a relatively rapid rate, with a unitary stop mechanism attachable to said member and adapted to stop said member when the latter has been fed to a predetermined location, and with interlock means between said rapid motion lever and said stop mechanism for rendering the latter inoperative when said rapid motion lever is actuated.

A more specific object of the invention is to provide a turret lathe with a novel and improved stop mechanism for stopping the turret slide at various predetermined positions thereof, each corresponding to the position of a tool mounted in the turret at the completion of the cutting operation of that tool; the said mechanism comprising a unitary structure carried by the turret slide and having a plurality of adjustable stops indexed by indexing of the turret, the said stops selectively cooperating with means within the unit and operatively associated with the feeding mechanism for the slide to automatically disengage the feeding means for the slide, and to substantially simultaneously positively stop the slide at the positions corresponding to the predetermined adjustments of said stops.

A still more specific object of the invention is to provide a turret lathe with a novel and improved stop mechanism for stopping the turret slide at various predetermined positions thereof, the said mechanism comprising a unitary structure carried by the turret slide and including means positioned by indexing of the turret to select a portion of the stop mechanism in accordance with the indexed position of the turret, means adjustable in accordance with the desired limit of movement for each indexed position of the turret, and means jointly controlled by movement of said slide and said selected portion and cooperating with said adjustable means to stop the movement of said slide at the desired predetermined limit of movement for the indexed position of the turret.

The invention further resides in certain novel features, details of construction, and combinations and arrangements of parts as will be apparent to those skilled in the art to which the invention pertains, from the following description of the preferred embodiment thereof, described with reference to the accompanying drawings in which similar reference characters represent corresponding parts throughout the several views and in which:

Fig. 3 is a fragmentary top plan view, on an enlarged scale, of the structure illustrated in Fig. 2 with parts broken away and others in section to reveal the operative connection between the turret and the stop mechanism, and the interlock between the stop mechanism, the rapid motion control lever and the feed control lever;

Fig. 7 is a front view of the improved stop mechanism with the cover removed and with portions broken away and other portions shown in section to more clearly reveal the construction;

Fig. 8 is a detached view of certain elements of the improved stop mechanism illustrated in one of their operative positions;

Fig. 9 is a view similar to Fig. 8 with the elements thereof in a different operating position;

Fig. 10 is a view similar to Figs. 8 and 9 and illustrating the elements of the improved stop mechanism in a still different position;

Fig. 11 is a detached view of the latch mechanism of the improved stop mechanism with the latch thereof in one of its operative positions;

Fig. 12 is a view similar to Fig. 11 illustrating the latch in a slightly different position;

Fig. 13 is a sectional view taken substantially on the irregular section line 13—13 of Fig. 7;

Figure 1:
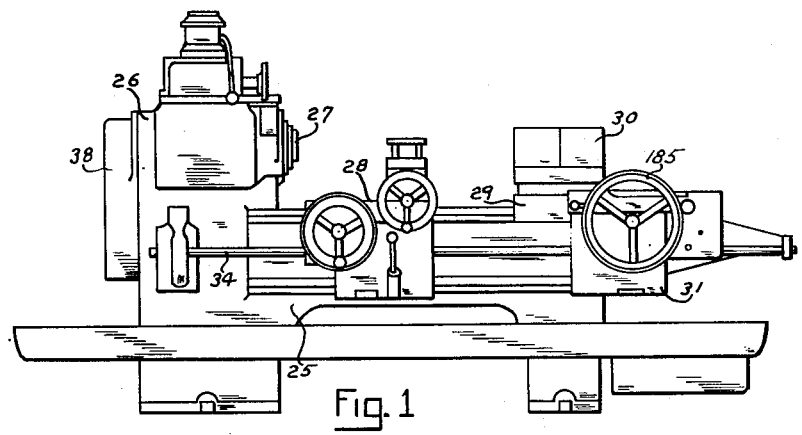
Fig. 1 is a side elevational view of a turret lathe with the present preferred embodiment of the invention attached thereto.

In Fig. 1 of the drawings there is illustrated a turret lathe of more or less conventional construction having a tool supporting movable member to which the improved stop mechanism of this invention has been attached. The lathe comprises the usual bed or support 25 upon which is supported the head 26 carrying the work spindle and chuck 27 which are driven in the usual manner. Slidably mounted upon the bed 25 are a cross slide mechanism, generally designated 28, and a slide or movable member 29, the latter being provided with an indexible turrent 30 and a depending apron 31. The movable member or slide 29 may be moved along the bed or support 25 by providing the latter with a rack 32 with which a pinion 33, rotatively carried by the member or slide, cooperates. This pinion is connected through the usual gearing mechanism, including a clutch, to the feed shaft 34, the clutch being controlled by a feed control lever 35 in the well-known manner. That is to say, the control lever 35 is rockable for engaging and disengaging the clutch and is provided with a pin 36, adapted to enter an opening in a bushing 37 provided upon the front face of the slide 29 when the clutch is engaged, the pin 36 being dislodged from the bushing 37 by mechanism, hereinafter described when the slide has moved a predetermined distance thereby allowing the lever 35 to drop by gravity and disengage the clutch of the gear train. Alternatively, the feed control lever and clutch controlled thereby may be omitted, the pinion 33 then being operatively connected to the feed shaft through conventional mechanism including a friction clutch which will slip when the movable member or slide 29 is positively held from movement by the stop mechanism as hereinafter described.

The feed shaft 34 of the illustrated lathe is rotated, in timed relation with the rotation of the work spindle and chuck 27, by the usual gearing contained within the gear box 38 thereby producing a feeding movement of movable member or slide 29.

Figure 5:
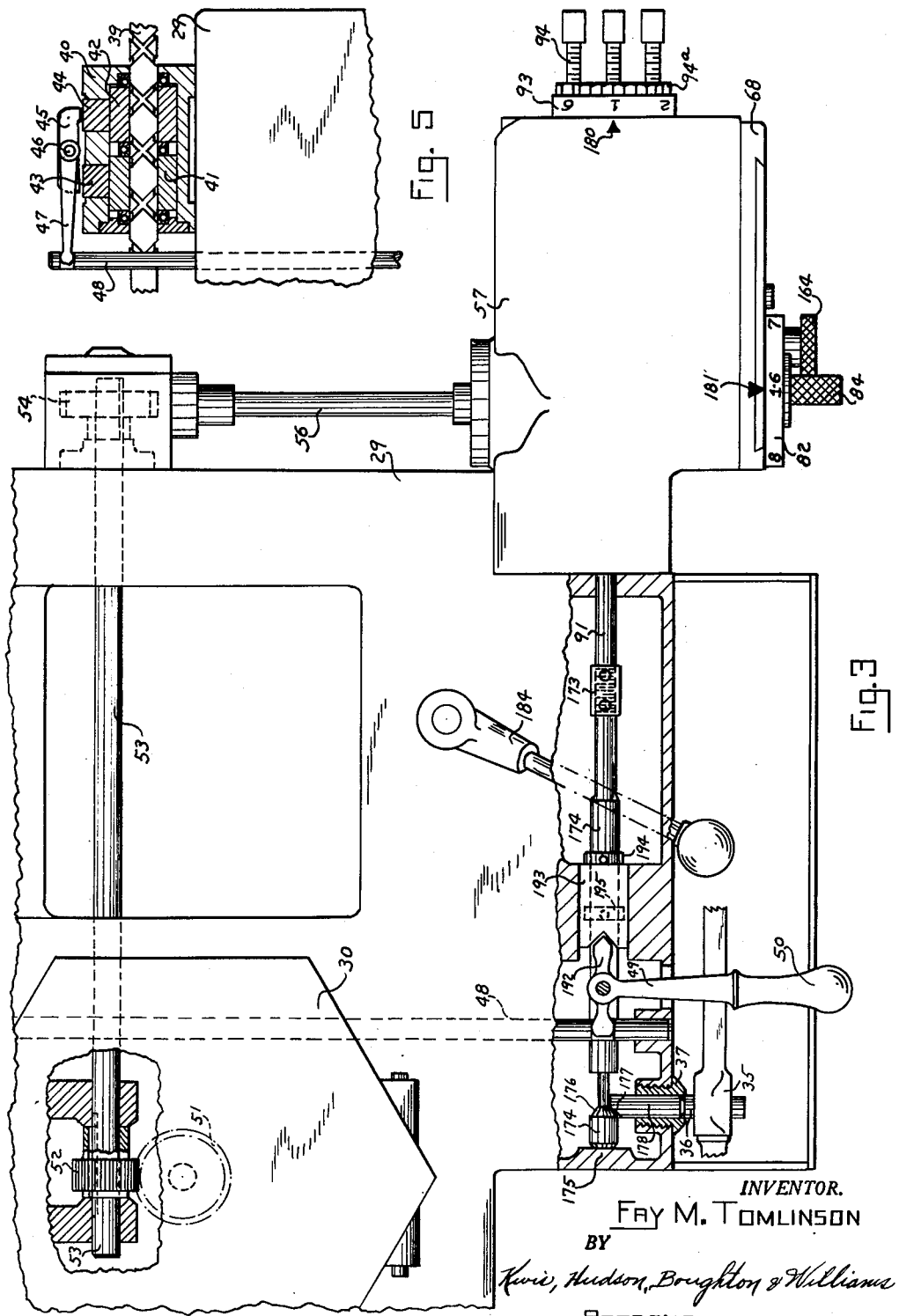
Fig. 5 is a fragmentary top plan view, partially in section and partially in elevation, illustrating the rapid motion mechanism for the turret slide of the lathe.

Connected with a suitable power source, which may be the same as that employed for rotating the work spindle, is a quick motion screw 39 (see Fig. 5) provided with both right-hand and left-hand threads of relatively large pitch. This screw passes through a housing 40, mounted upon the rear portion of the slide or movable member 29, and surrounding the screw within the housing 40 are a pair of nuts 41 and 42. These nuts are freely rotatable with the screw and are held against axial movement by the housing 40, the nut 41 being provided with a thread cooperating with one of the threads upon the screw 39 and the nut 42 being provided with a thread cooperating with other of the threads upon the screw. Extending through the rear side of the housing 40 are a pair of plungers 43 and 44 cooperating, respectively, with the nuts 41 and 42, the outer end of each of the plungers being engaged by one end of an equalizing bar 45. The bar 45 is pivoted to the housing 40 at 46 and the pivot pin is provided at its upper end with an operating arm 47, the outer end of the latter engaging within a slot in an actuating rod 48 which extends transversely of the slide or movable member 29 to the front thereof.

Figure 2:
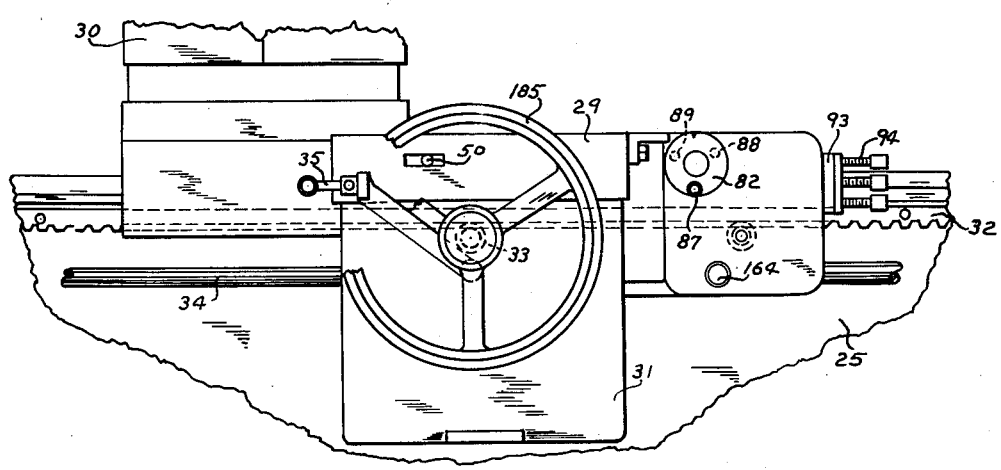
Fig. 2 is a fragmentary side elevational view, on an enlarged scale, of the turret slide and apron of the lathe illustrated in Fig. 1 with the improved stop mechanism attached thereto.

The actuating rod 48 is also provided with a slot adjacent its forward end in which the inner end of one arm of a rapid motion control lever 49 is engaged. This lever is pivoted to the slide 29 intermediate its ends and is provided with an operating handle 50 extending through the front of the slide. The construction is such that when the operator grabs the handle 50 and rocks the lever to the left, as viewed in Figs. 2, 3 and 4, the actuating rod 48 is moved rearwardly thus rocking the arm 47 in a clockwise direction and moving the equalizing bar 45 in a direction to force the plunger 44 inwardly into engagement with the nut 42 thereby holding the latter stationary. Consequently, the rotation of the screw 39 will now cause the slide 29 to be moved at a relatively rapid rate towards the headstock of the lathe. When the operator releases the handle 50, the plunger 44 no longer holds the nut 42 stationary so that the relatively rapid movement of the slide ceases.

Actuation of the handle 50 of the control lever in the opposite direction moves the rod 48 forwardly thus causing the equalizing arm 45 to move the plunger 43 into engagement with the nut 41 preventing rotation of the latter and causing the slide 29 to move at a relatively rapid rate in a direction away from the head. Conventional mechanism, not shown, is provided to terminate the movement of the slide at the relative rapid rate in a rearward direction at its extreme position. As previously stated, the actuating rod 48 and the control lever are normally in a neutral position, and interlock mechanism, hereinafter described, is provided for disengaging the feed control lever 35 and for rendering the stop mechanism ineffective when the rapid motion control lever is actuated.

The shaft of the turret 30 is provided, adjacent its lower end, with a spiral pinion 51 which cooperates with a spiral pinion 52 keyed to a shaft 53. The shaft 53 is supported in suitable bosses provided in the slide and extends longitudinally of the latter and through the end wall thereof, the outer end of the shaft being provided with a second spiral gear 54 (see Fig. 6). The gear 54 meshes with a spiral gear 55 mounted upon a shaft 56, which extends towards the front of the slide adjacent the end wall thereof and enters through the side of a housing 57 for the improved stop mechanism of this invention. This housing is preferably attached by means of screws or the like, not shown, to the forward side portion of the slide or movable member 29.

Figures 14, 15:
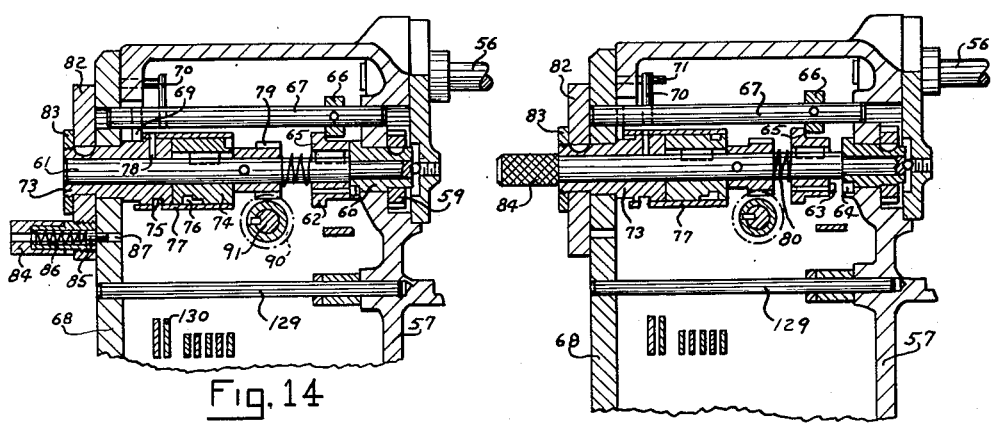
Fig. 14 is a sectional view taken substantially on the irregular section line 14—14 of Fig. 7 with the lower portion of the housing broken away.
Fig. 15 is a view similar to Fig. 14 but showing certain of the portions thereof in different operative relationships.

The end of the shaft 56, which is within the housing 57, is provided with a spur gear 58 (see Fig. 7) which meshes with a spur gear 59 connected with a clutch sleeve 60. As shown in Figs. 14 and 15, the clutch sleeve 60 is freely rotatable upon a shaft 61, extending transversely of the housing 57, and adjacent the clutch sleeve 60 is a movable clutch member 62 which is slidably keyed to the shaft 61 for rotation therewith. The clutch member 62 is provided with a projecting clutch pin 63 which is adapted to enter a single opening 64 in the clutch sleeve 60 when the pin and opening are aligned. The clutch member 62 is also provided with a shoulder 65 for cooperation with a collar 66 pinned to an axially movable rod 67, the rod being slidably mounted in a boss provided in the housing 57 and an opening in the cover plate 68 for the housing. This rod 67 has a downwardly extending pin 69 for a purpose later to be described, the rod 67 also being provided with an upwardly extending pin 70 slidably held between two horizontally extending pins 71 and 72 to prevent rotation of the rod.

Figures 16, 16A:
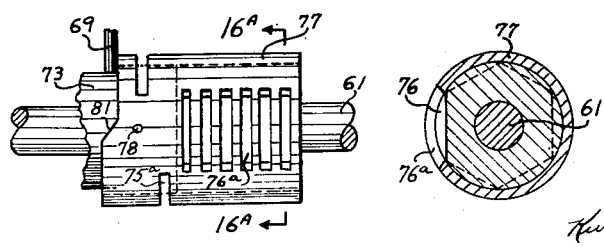
Fig. 16 is a detached side elevational view of a portion of the mechanism illustrated in Figs. 14 and 15.
Fig. 16A is a sectional view taken substantially on the section line 16A—16A of Fig. 16.

The shaft 61 is further provided with a cylindrical sleeve member 73, the outer end of which is reduced in diameter and journaled in the cover plate 68 of the housing 57. The inner end of the sleeve 73 has a frictional engagement with a second cylindrical sleeve member 74 which is keyed to the shaft 61. These sleeve members 73 and 74 have segmental slotted openings 75 and 76, respectively, and the slots are circumferentially and axially disposed about the peripheries of the members 73 and 74 for a purpose hereinafter described. In the illustrated embodiment (see Figs. 7, 16, and 16A), the cylindrical member 74 has six such slots equally spaced about its periphery while the member 73 has but two slots the midpoints of which lie on radii spaced 120 degrees from each other.

Surrounding the members 73 and 74 is a hollow cylindrical sleeve member 77 connected to the cylindrical member 73 by a pin 78. The hollow sleeve 77 is provided with two groups of slots 75a and 76a for cooperation with the previously mentioned slots 75 and 76 in the cylindrical members 73 and 74, respectively. Since the sleeve 77 is fixed to the cylindrical member 73, the slots 75a in the sleeve 77 are circumferentially and axially spaced to align with the slots 75 in the member 73. The slots 76a in the sleeve 77 are axially spaced in accordance with the axial spacing of the slots 76 in the cylindrical member 74. However, all the slots 76a are in circumferential alignment and are circumferentially intermediate the slots 75a. The members 73, 74 and 77 are hereinafter sometimes referred to collectively as a positionable means.

The shaft 61 is further provided with a spiral gear 79, the gear being connected with the shaft for rotation therewith and having one face thereof bearing against the outer face of the sleeve 74. Between the gear 79 and the clutch member 62 is disposed a compression spring 80 exerting force to normally effect engagement of the clutch member 62 with the clutch sleeve 60 and also forcing the gear 79 and the shaft 61 in a direction to frictionally engage the sleeve members 73 and 74 as previously mentioned. The end of the sleeve 77, adjacent the cover 68 of the housing, is provided with a cam surface 81 cooperating with the previously mentioned pin 69. Hence, when the sleeves 73 and 77 are rotated, the pin 69 and the rod 67 will be moved to the left as viewed in Figs. 14 and 15 by the action of the cam 81. This causes the collar 66 to engage the flange 65 or the clutch member 62 and move the latter against the force of the spring 80 thereby disengaging the clutch pin 63 from the corresponding opening 64 for a purpose hereinafter described.

To effect this rotation of the sleeves 73 and 77, the outer portion of sleeve 73 is provided with a dial 82 which is keyed to the sleeve 73, the dial being retained against the outer face of the cover 68 by a nut 83 threaded upon the outer end of the sleeve 73. The dial 82 is provided with a pull-pin handle 84 having a pin 85 adapted to enter one or more openings in the face of the plate 68, the pin being urged into the said openings by means of a spring 86 engaging a head on the pin 85 and the inner face of an internal shoulder provided upon the stationary portion of the pull-pin mechanism in a conventional manner. The face of the plate 68 is provided with three spaced openings 87, 88, and 89 within which the pin 85 of the pull-pin mechanism may be selectively positioned to effect different operations of the stop mechanism as hereinafter described.

The previously mentioned gear 79 meshes with a spiral gear 90 slidably keyed to a shaft 91 which extends transversely of the shaft 61. The gear 90 has an extension sleeve integral therewith which passes through one side wall of the housing 57 and is retained against axial movement with respect to the housing by means of nuts or collars 92 and 92a. One end of the shaft 91 extends through a suitable opening in the slide or movable member 29 for a purpose hereinafter described. The other end of the shaft is provided with a stop roll 93 which is rotatable and axially movable in the other end wall of the housing 57.

The stop roll 93 is provided with a plurality of circumferentially spaced adjustable stop screws 94, each of the latter having a nut 94a thereon adjacent the outer face of the stop roll with the sides of adjacent nuts in engagement with each other to prevent rotation thereof. The outer ends of the stop screws 94 are provided with heads 95 which may be engaged by the fingers of the operator or by a wrench or other tool for turning the said stop screws to adjust their axial positions within the stop roll. Rotation of the screws, independent of a positive turning movement, is prevented by means of springs 96 which are provided in recesses of the stop roll 93 and bear against the nuts 94a thus providing an end pressure upon the screws. Axial movement of the stop roll 93 relative to the shaft 91, in one direction, is prevented by a ring 97 which is held in place by a washer 98 and a screw 99, the latter being threaded into the end of the shaft. Axial movement of the stop roll relative to the shaft, in the other direction is prevented by a plate 188 and a split washer 189. The stop roll 93 normally rotates with the shaft 91 by virtue of a spring detent 186 carried by the roll and selectively engaging one of a plurality of spaced openings 187 in the plate 188.

Assuming that the clutch formed by the clutch elements 60 and 62 is engaged, indexing of the turret acts through the gears 51, 52 to rotate the shaft 53 and the gear 54. The gear 54 in turn rotates the gear 55, shaft 56 and gear 58. The rotation of the latter gear causes the gear 59 to turn the clutch elements 60 and 62, thereby turning the shaft 61 and the gear 79 mounted thereon. The gear 79 in turn rotates the gear 90 and its shaft 91 correspondingly rotating the stop roll 93. Hence, indexing of the turret produces a corresponding indexing of the stop screws 94 carried by the stop roll. The rotation of the shaft 61 will also have correspondingly rotated the cylindrical sleeve member 74 to align one of the slotted openings 76 therein with the corresponding opening 76a in the sleeve 77 for a purpose hereinafter described.

Figure 19:
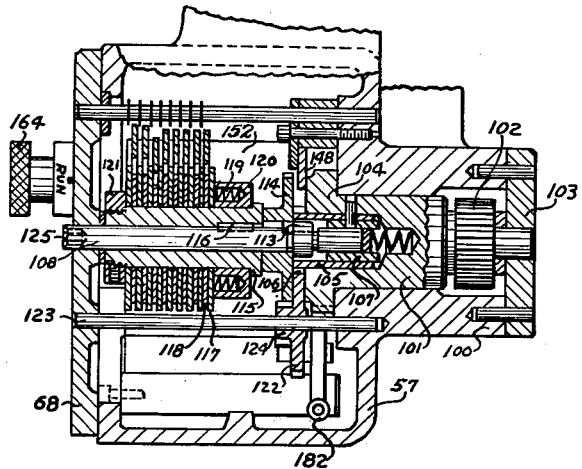
Fig. 19 is a sectional view taken substantially on the irregular section line 19—19 of Fig. 7.

The rear portion of the housing 57 is provided with a rearwardly extending boss 100 (see Figs. 17 and 19) in which a shaft 101 is rotatably journaled. The outer end of the shaft 101 is provided with an integral rack pinion 102, the shaft 101 having an extension of reduced diameter beyond the rack pinion which is journaled in a bearing plate 103 connected to the boss 100. The inner end of the shaft 101 is provided with an integral ratchet wheel 104, adjacent the inner surface of the rear wall of the housing 57. The inner end of the shaft 101 is also provided with a central bore within which is disposed a sleeve 105, the outer end of which is provided with an integral gear 106. Within the sleeve 105 is a bushing 107 and within the latter is positioned the inner end of a shaft 108, the outer end of the shaft extending through an opening in the cover plate 68 for the housing 57. The inner end of the shaft 108 bears against a spring washer 109, between which and the bottom of the bore is provided a compression spring 110 acting to force the shaft 108 towards the front of the housing. The shaft 101, the sleeve 105 and the bushing 107 are connected together by a pin 111 for movement in unison as hereinafter described, the shaft 108, however, being free to move endwise within the bushing.

The shaft 108 is provided with an integral shoulder 112 having an axially extending key 113 which is slidable within a keyway provided in gear 114 rotatably mounted upon the shaft 108. Adjacent the gear 114 is mounted a drum 115 which is provided with a keyway in which a key 116, carried by the shaft 108, is slidable, thus permitting axial movement of shaft 108 within the drum 115 without axial movement of the latter.

The circumference of the drum 115, intermediate its ends, is provided with longitudinally extending serrations for receiving circular disks 117 whose central openings have correspondingly shaped serrations to key the said disks to the drum for rotation therewith. Intermediate the disks 117 are provided somewhat smaller diameter rotatable cams or notched disks 118 having central circular openings of sufficient diameter to rotate upon the outer projections of the serrations on the drum 115. The disks 117 and the cams or disks 118 are alternately arranged with a disk 117 on each outer end of the series. The disks are held in frictional engagement by a plurality of springs 119, which are circumferentially spaced about a collar member 120 mounted upon the drum 115. The outer face of the collar 120 bears against an integral flange upon the drum 115 with the springs 119 bearing against the adjacent disk 117 while the disk 117 at the other end of the drum 115 bears against a nut 121 which is threaded upon the end of the drum 115. The construction is such that the disks 117 and 118 are held frictionally for rotation together, the disks or cams 118 being individually rotatable relative to the disks 117 for purposes of adjustment.

The previously mentioned rack pinion 102 is in engagement with the rack 32 on the bed or support of the lathe so that when the movable member or slide 29 and the housing 57 are moved along the bed or support, the pinion 102 will be rotated. Rotation of the rack pinion 102 rotates its integral shaft 101 and hence the ratchet wheel 104. Also, since the sleeve 105 is pinned to the shaft 101, the gear 106 is rotated. This latter gear is in mesh with a gear 122 which is supported upon a shaft 123 journaled in the housing 57 and the cover plate 68. The gear 122 is integral with a smaller gear 124 which is in mesh with the previously mentioned gear 114 keyed, by the key 113, to the shoulder 112 on the shaft 108. Hence, when the slide or movable member 29 is moved along the bed or support, the gear 114 is driven through the gear train just described causing rotation of the drum 115 and the disks 117 and 118 mounted thereon.

Figure 20:
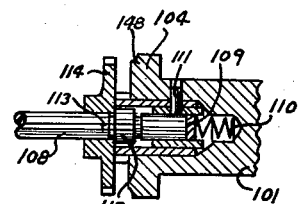
Fig. 20 is a detached view, partly in section and partly in elevation, illustrating certain elements shown in Fig. 19 in a different operating position.
Figure 21:
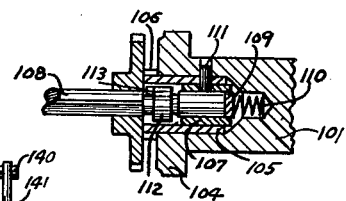
Fig. 21 is a detached view similar to Fig. 20 but illustrating the parts in a still different position.
Figure 22:
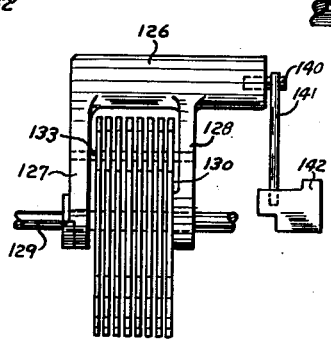
Fig. 22 is a detached side elevational view of the movable fingers or elements and the counterweight member of the improved stop mechanism illustrated in Fig. 7.
Figure 23:
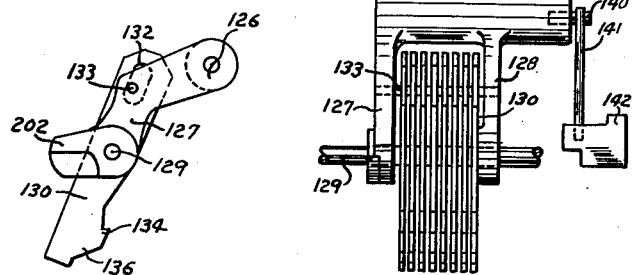
Fig. 23 is a detached elevational view looking from the right of Fig. 22 and further illustrating the operative connection between the counterweight member and the slide of the stop mechanism.

This gearing connection for rotation of the drum 115 and the disks 117 and 118 may be disconnected by inserting a tool in an opening 125 provided at the outer end of the shaft 108, pressing inwardly on the shaft and rotating the latter when it is thus pushed inwardly against the action of the spring 110. The shoulder 112 and the key 113 thereon will thus be moved relative to the gear 114 (see Figs. 20 and 21) thus disengaging the key 113 from the keyway in the gear so that the shaft 108, the drum 115 and its disks may be rotated independently of the gearing and the rack pinion 102. Hence, as the operator continues to push inwardly and turn the tool which has been inserted in the opening 125, the disks or cams 118 are rotated for adjustment purposes as hereinafter described. Preferably, the gears 106, 122, 124 and 114 have a ratio such that the rotation imparted to the drum 115, when the key 113 is reengaged with the gear 114, for the complete length of travel of the housing 57 and the slide or member 29 is less than one complete revolution of the drum.

Referring now to Figs. 7 through 10, 13, 22 and 23, it will be observed that a counterweight member 126 extends transversely of the housing 57 and is provided with downwardly extending spaced arms 127 and 128 which are journaled upon a stationary shaft 129 mounted in the housing and the cover plate. Intermediate the arms 127 and 128 of the counterweight 126 are mounted a plurality of movable elements or fingers 130, each of which is provided with an elongated slot 131 through which the shaft 129 passes with clearance. The elements or fingers are each provided, adjacent their upper ends, with a second slot 132 through which passes a rod 133 carried by the arms 127 and 128 of the counterweight. The lower end of each element or finger is provided with a forwardly extending catch portion 134 adapted to engage a notch 135 provided on the corresponding cam or disk 118, it being understood that there is one element or finger for each cam or disk 118 and that the catch portion of each finger rides between adjacent disks 117. Each of the elements or fingers 130 is also provided with a camming surface 136 for a purpose hereinafter described.

The upper portions of the elements or fingers have a width such as to permit them to enter into the previously mentioned slots 75, 75a and 76, 76a provided in the sleeve members 73, 74 and 77, there being one element or finger corresponding to each of the slots. The fingers are urged in a direction for entering the slots by individual springs 137, the lower end of each spring having one end connected to a bar 138 extending forwardly and rearwardly of the housing 57, the springs being looped about the shaft 129 and having their upper ends respectively connected to pins 139 carried by the fingers.

The counterweight member 126 has a projection 140 extending rearwardly from the arm 128 and engaging the upper end of a rod 141 extending upwardly from a latch member 142. The latch member 142 has its rear portion pivoted at 143 to a substantially horizontally moving slide member 144 which is guided within suitable ways 145 provided upon the inner rear face of the housing 57. The forward portion of the latch 142 has a downwardly directed extension or nose portion 146 adapted to extend into engagement with the ratchet teeth upon the ratchet wheel 104. Pivoted upon the latch member, intermediate its ends, is a half-moon pendulum member 147 which extends vertically downward under the action of gravity to ride upon a peripheral shoulder 148 provided upon the ratchet wheel 104 (see Figs. 11 and 12), the pendulum member acting in a manner hereinafter described to guide the movement of the latch to and from engagement with the teeth of the ratchet wheel.

Attached to the upper surface of the latch 142 is an extension plate 149 which extends forwardly of the latch in overhanging relationship with respect to a vertically movable actuating member 150 which is supported by slotted openings, adjacent either end, upon the rods 151 and 129 mounted in the housing and cover plate. This member 150 will normally fall by gravity to its lower position thus permitting free operation of the pendulum member 147 and the latch 142. The lower end of the member 150 is positioned to be engaged by a nose portion 152 of a lever or arm 153 which is journaled upon a rod 154 extending forwardly and rearwardly of the housing adjacent the lower portion thereof, the nose portion 152 also extending under the lower ends of the elements or fingers 130. The rear portion of the lever or arm 153 is provided with a rearwardly extending pin 155 about which is placed one end of a coil compression spring 156, the other end of the spring being received about a pin 157 mounted in an extension portion 158 of a pawl member 159 which is also pivotally mounted upon the shaft 154. The forward portion of the pawl member 159 is provided with a nose 160 adapted to engage the teeth of the ratchet wheel 104, it being apparent that the spring 156 will tend to cause the pawl 159 to move with the lever or arm 153 when the latter is rocked, the spring also providing relative movement between these members in the event the nose of the pawl strikes the outer end of one of the teeth on the ratchet wheel, the spring thereafter functioning to move the nose of the pawl into the space between the teeth when the ratchet wheel has rotated sufficiently to permit this action.

Extending forwardly and rearwardly of the housing 57 adjacent the bottom thereof is a shaft 161 which is provided with a cam member 162 engaging the lower surface of the lever or arm 153 to move the latter. As illustrated, this cam is substantially cylindrical and has a flattened portion 163 which, when positioned as shown in Figs. 7, 8 and 9 allows the lever 153 to drop to its lowermost position carrying with it the pawl 159 and thereby disengaging the nose 160 of the latter from the teeth of the ratchet wheel. This also allows the actuating member 150 to move to its lowermost position permitting the plate 149 and the latch 142 to move freely.

The rod 161 extends through the cover member 68 and is provided on its outer end with an actuating knob 164 whereby the cam portion 162a may be moved from the position shown in Figs. 7, 8 and 9 to the position shown in Fig. 10. It will be observed that in the latter position of the cam member the lever 153 has actuated the member 150 upwardly, thus engaging the plate 149 thereby moving the latch member 142 from engagement with the teeth of the ratchet wheel, the pendulum member 147 remaining in continuous engagement with shoulder 148 on the ratchet wheel. This movement of the lever 153 also carries the pawl member 159 into engagement with the teeth of the ratchet wheel, the nose of the pawl entering the space between the teeth as shown in Fig. 10. As previously mentioned in the event the teeth are so positioned that the nose 160 strikes a tooth, the spring 156 permits relative movement between the pawl member 159 and the lever 153, the nose 160 subsequently engaging between the teeth under the force of the spring 156 when the ratchet wheel has rotated sufficiently to permit this action.

It will be observed that this actuation of the lever 153 causes its nose 152 to strike the rod 151 thus providing a locked position of the lever since the latter is also held by the cam 162. This engagement of the nose 152 with the rod 151 also provides a definite limit to the movement of the knob 164 in one direction. The knob 164 is held in this position, or in its position shown in Figs. 7, 8 and 9, by a spring detent 165 (see Fig. 13) which is provided in the cover 68 of the housing and cooperates with suitably spaced recesses or openings 166 in a collar 167 connected with the knob 164. Rotation of the cam member 162 to the position indicated in Figs. 7, 8 and 9 is limited by means of a pin 168 mounted in the front wall of the housing 57 and cooperating with a flattened portion 169 provided on the forward end of the cam member 162, this pin and flattened portion also serving to further limit the movement of the cam to its actuated position illustrated in Fig. 10.

As shown in Fig. 7, the stop roll 93 is provided with an integral flange 170 on its inner face and this flange has a plurality of spaced openings 171 corresponding in number and spacing to the number of adjustable stop screws 94. The housing 57, adjacent the flange 170, is provided with a relatively strong spring detent 172 for cooperation with the openings 171 to retain the stop roll in an adjusted position and to force the stop roll inwardly of the housing. The shaft 91, on which the stop roll is mounted, extends through a suitable opening in the movable member or slide 29 and is connected with an aligned rod or shaft 174 by means of an adjustable connection 173 (see Fig. 3). The other end of the rod or shaft 174 is extended to a boss 175 within the movable member or slide 29 thus limiting the movement of shafts 174, 91 and the stop roll 93 with respect to the housing 57 under the influence of the spring detent 172.

Adjacent its outer end the shaft 174 is provided with a conical surface 176 for cooperation with a beveled surface 177 provided upon a knock-out pin 178 which is slidable within the previously mentioned bushing 37 to engage the pin 36 and knock the latter out of the bushing thereby disengaging the feed clutch as previously described. The shaft 174 is moved to the right, as viewed in Fig. 3, for effecting this disengagement of the feed clutch when the stop roll 93 is moved to the right against the action of the spring detent 172, the motion being limited in this direction by the abutment of the flange 170 with the inner surface of the housing 57. This movement of the stop roll to the right is effected by engagement of the previously mentioned slide 144 with that stop screw 94 which is aligned therewith when the latch 142 has engaged a tooth of the ratchet wheel 104, the latch moving the slide against the action of a spring 179 attached to the slide 144 and to a pin fixed to the housing 57. The construction is such that when the latch is disengaged from the ratchet wheel 104, the spring 179 will move the slide 144 to the left as viewed in Fig. 17 thus allowing the stop roll 93 to move in that direction under the influence of the spring detent 172. The shaft 174 will thus be returned to the position as shown in Fig. 3 allowing the control lever 35 to be re-engaged.

The cooperative interaction of the various parts of the stop mechanism can be best understood from a description of the setting up of the device for an operative cycle and the operation after being so set up. In the setting-up operation, the operator will first grasp the pull pin 84 and turn the dial 82 approximately half a turn. This will cause the cam 81 on the sleeve 77 to move the pin 69, and hence rod 67, to the left as shown in Figs. 14 and 15, thus causing the collar 66 to disengage the clutch member 62 from the clutch sleeve 60, as shown in Fig. 15, thus disconnecting the indexing drive from the turret to the stop roll. The stop roll 93 is then manually turned to align the numeral "1" thereon, corresponding to that stop screw 94, which is similarly marked, with the arrow 180 provided upon the housing 57 (see Fig. 3). The operator then moves the turret 30 to bring the "number 1" face thereof into operative position and rotates the dial 82 back to the position in which the numerals "1-6" on the periphery thereof are in alignment with the arrow 181 provided upon the face of the cover 68. This returns the sleeve 77 and its cam 81 to their positions as shown in Fig. 14 thus causing the pin 63 of the clutch member 62 to re-engage with the opening 64 of clutch sleeve 60 under the action of the spring 80. Therefore, the cylindrical member 74 and the stop roll have been coordinated with each other and with the turret, the cylindrical member being positioned to align one of the slots 76 therein with the corresponding slot 76a in the sleeve 77, this slot corresponding to the selected face of the turret and the stop screw of the same number in the stop roll.

The slide or movable member 29 is then moved up to its desired forward stopping position and the active stop screw 94, i. e., the screw which has been positioned in alignment with the arrow 180, is backed out. The operator next turns the knob 164 in a counter-clockwise direction to its extreme position. This causes the high portion 162a on the cam member 162 to engage the lever or arm 153 moving the latter to the position shown in Fig. 10 and carrying the pawl 159 with it, through the action of spring 156, so that the nose 160 of the pawl either engages between the teeth of the ratchet wheel 104 or rests upon the top of one of the teeth. If the nose of the pawl strikes one of the teeth on the ratchet wheel, the spring 156 is compressed thus permitting relative movement between the pawl 159 and the arm 153. The forward portion of the arm 153 moves the actuating member 150 upwardly and the upper end of this member engages the plate 149 causing it, and the latch 142 attached thereto, to be moved upwardly to the position illustrated in Fig. 10, the pendulum member 147 remaining in engagement with the shoulder 148 by action of gravity.

The active movable element or finger 130, corresponding to the selected face of the turret, will have had its upper end moved into its slots 76 and 76a in the sleeves 74 and 77 by action of its spring 137 as shown in Fig. 8, the upper ends of the other elements or finger being held outwardly by engagement with the periphery of the sleeve 77 as shown in Figs. 7, 9 and 10. The catch portion 134 of the active finger 130 will be resting upon the periphery of its corresponding cam or disk 118 ready to drop into the notch 135 when the latter aligns with the catch.

The operator then backs the slide or movable member 29 slowly a short distance, thus causing the nose 160 of the pawl 159 to move into the space between two of the teeth on the ratchet wheel 104, this movement of the pawl being caused by the previously mentioned spring 156. The pawl 159 is provided with an extension portion forming a hammer 182 (see Fig. 7) which cooperates with a sounding device which may be a gong or a spring 183. Hence, each time the pawl is actuated by the teeth of the ratchet wheel, the hammer will strike the sounding device 183 emitting a tone. The previously mentioned movement of the movable member 29 backwardly from its desired stop position is just sufficient to cause two sounds to be produced by the hammer and member 183. Hence, the nose 160 of the pawl member 159 will come to rest between two of the teeth of the ratchet wheel 104. The operator then moves the slide or movable member 29 forwardly slightly to bring the adjacent tooth of the ratchet wheel into firm contact with the nose 160 of the pawl 159 thus locking the ratchet wheel and the slide 29 against further movement in the forward direction.

The operator next inserts a tool, such as a crank or the like, into the opening 125 at the end of shaft 108 and pushes the latter inwardly while rotating it in a counterclockwise direction thus disengaging the key 113 from the gear 114. He continues rotating the tool and shaft in a counterclockwise direction, thereby rotating the drum 115 in a counterclockwise direction, until the catch 134 of the active finger 130 drops into the notch 135 of the corresponding cam or disk 118 which will be evidenced by resistance to the manual rotation of the drum. This movement of the finger 130 causes the upper slot 132 in the latter to engage the rod 133 upon the counterweight member 126 rocking the latter upwardly to the position shown in Figs. 7 and 8 thus moving the projection 140 thereon from contact with the rod 141 so that the latch 142 may rock at a later time. The operator continues to turn the shaft 108, after the catch of the finger has dropped into the notch 135, until the key 113 re-enters the keyway in the gear 114 which will be evidenced by a slight outward movement of the shaft 108 under the action of the spring 110. This latter rotation will have caused the engaged disk 118 to slip relative to the drum 115 since the nose portion 152 of the arm 153 is now under the end of the active finger 130 preventing it from moving downwardly. The notch of the engaged disk is now properly angularly positioned with respect to the ratchet wheel 104 and the rack pinion 102.

The operator then removes the tool from the opening 125 and turns the knob 164 in a clockwise direction, returning the cam 162 to the position shown in Figs. 7, 8 and 9, thus allowing the arm 153 and the pawl 159 to drop by gravity freeing the pawl from the ratchet wheel. This movement of the arm 153 back to its inactive position enables the plate 150 to move downwardly under the influence of gravity thus freeing the plate 149 and the latch 142 for rocking movement, the nose portion 146 of the latch dropping downwardly into the space between two of the teeth of the ratchet wheel 104, since, as previously mentioned, the projection 140 has been moved from engagement with the rod 141. The lower end of the active finger is also freed by the movement of the arm 153 back to its inactive position.

Figure 6:
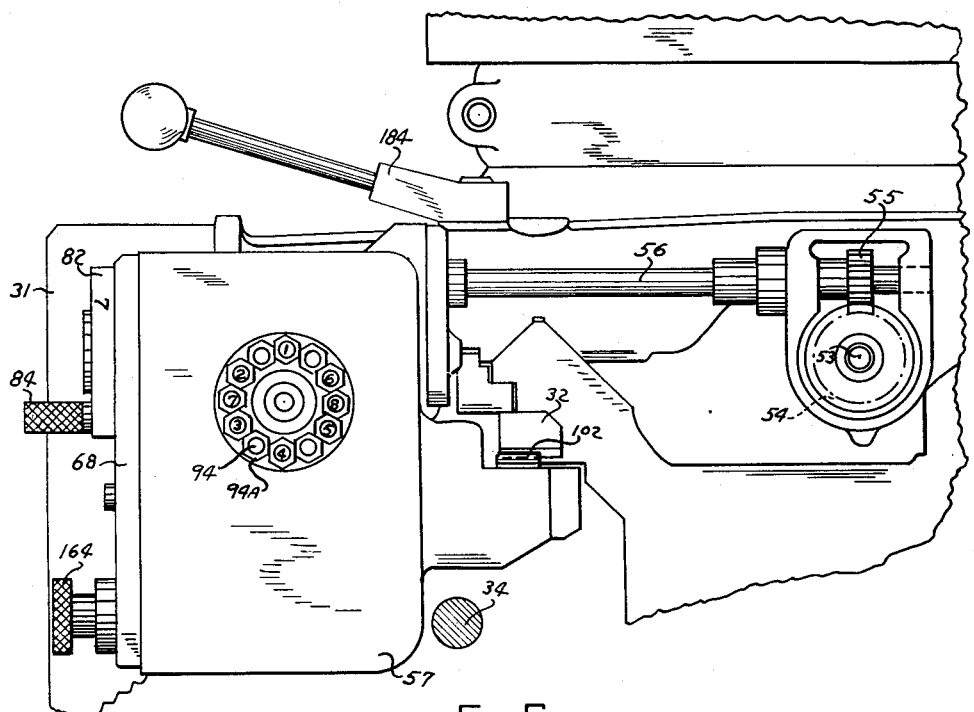
Fig. 6 is a fragmentary end elevational view, on an enlarged scale, of the mechanism illustrated in Fig. 2.

The operator next moves the slide 29 forwardly to its desired stop position and locks it to its support or bed 25 by means of the conventional locking lever 184 (see Figs. 3 and 6). Since the nose portion 146 of the latch 142 is now positioned between two teeth of the ratchet wheel 104, this last-mentioned movement of the slide 29 causes the ratchet wheel to move the latch and its slide 144 to the right against the action of the spring 179. The operator then engages the feed control lever 35 by positioning the pin 36 within the opening in the bushing 37, it being understood that the feed shaft 34 is not in operation so that the slide is not driven for movement along the bed or support. The operator next turns the active stop screw 94 inwardly until it engages the end of the slide 144 establishing a metal-to-metal contact through the latter and the latch to the ratchet wheel which cannot rotate since it is in driving relationship to the rack on the bed and the movable member or slide 29 has been locked thereto. Hence, continued turning of the screw 94 now causes the stop roll 93 to move outwardly with respect to the housing 57, from the position shown in Fig. 17 to that shown in Fig. 18, against the action of the spring detent 172. This movement of the stop roll carries with it the shafts 91 and 174 and the turning of the screw 94 is continued until the conical surface 176 on the shaft 174 actuates the knock-out pin 178 to displace the pin 36 of the feed control lever 35 from the bushing 37, the lever 35 then dropping by gravity to disengage the feed clutch. At this time the inner surface of the flange 170 should be in firm engagement with the inner face of the housing 57 as is evidenced by the inability to turn the screw 94 further. If this metal-to-metal contact between the flange and the housing has not occurred when the feed lever drops out, adjustment of the length of the shafts 91 and 174 is effected at the connection 173 until the above mentioned metal-to-metal contact is secured at the instant when the feed lever drops out.

The operator then loosens the slide clamp by actuating the handle 184, and the device has now been set up for effecting a stop of the movable member or slide 29 for the "number one" face of the turret at a predetermined position when the slide is moved under action of the feeding mechanism. That is to say, when the slide 29 is at the predetermined stop position, the finger 130 corresponding to the "number one" face of the turret, has dropped into the notch 135 of the corresponding cam or disk 118. Also, the tooth 146 of the latch 142 is in firm engagement with a tooth on the ratchet wheel 104, the slide 144 is in engagement with the end of the "number 1" stop screw 94, and the shoulder 170 on the stop roll is abutting with the inner face of the housing 57. Hence, the shafts 91 and 174 have been moved to effect the dropping out of the feed control lever with consequent disengagement of the clutch in the feeding mechanism. Since the ratchet wheel 104 is connected for rotation with the rack pinion 102, these members are positively locked so that no further movement of the slide 29 can occur for that face of the turret.

When the slide is moved rearwardly, preparatory to starting a machining operation, the notch in the active disk 118 pulls the active finger 130 downwardly against the action of the spring 137. The cam surface 136 on the finger will thus engage the rod 151 camming the catch portion 134 of the finger out of engagement with the notch 135. After the notch has passed the catch portion the spring 137 returns the finger to its upper position, the catch portion of the finger now riding on the periphery of the disk 118. The finger is therefore rocked freeing the rod 133 in the counterweight 126 so that the latter can rock downwardly. Hence, the projection 140 on the counterweight engages the rod 141 on the latch member disengaging the latter from the teeth of the ratchet wheel 104. The spring 179 then moves the slide 144 forwardly, the half-moon pendulum member 147 riding upon the flange 148 of the ratchet wheel to assist in further moving the latch from engagement with the ratchet teeth. As the latch is released from abutment with the stop screw 94, the spring of the spring detent 172 forces the flange 170 of the stop roll inwardly of the housing thus moving the shafts 91, 174 to the left, as viewed in Fig. 3, until the outer end of the shaft 174 abuts the boss 175. This permits the feed control lever 35 to be reengaged for effecting feeding movement of the slide since the conical surface 176 on the shaft 174 is positioned as shown in Fig. 3.

Assuming that the turret slide 29 has been moved rearwardly to its starting position and that the feed shaft 34 is now rotating, engagement of the feed control lever 35 will cause rotation of the feeding pinion 33 and the latter cooperates with the rack 32 to move the slide 29 forwardly. This movement of the slide 29, and of the housing 57 connected therewith, causes the pinion 102 to be rotated by cooperation with the rack 32 and this rotates the drum 115 and the cams or disks 118 through the gears 106, 122, 124 and 114. When the slide 29 has almost reached its predetermined position, the notch 135 of the preset disc 118 will have aligned with the catch 134 on the corresponding finger 130, which was selectively positioned by the indexing of the turret, so that the catch can drop into the notch under the action of spring 137, thus causing the counterweight member to rock upwardly, as previously described, freeing the latch 142. The latch 142 then moves downwardly, under the influence of gravity, into engagement with a tooth on the ratchet wheel 104, being guided in this movement by the half-moon pendulum member 147 which insures that the latch will always engage the same tooth as that engaged during the initial setup. A slight further movement of the slide 29, with consequent rotation of the ratchet wheel 104, moves the pawl 142 and its slide 144 into engagement with the active stop screw 94 which was positioned by the indexing of the turret. A still further slight movement of the turret slide then causes the stop screw in turn to move the stop roll 93 until the flange 170 thereof abuts the end of the housing 57. This latter movement causes the feed control lever to drop out, by the action of the conical surface 176 on the shaft 174, disengaging the feeding drive for the pinion 33. The substantially simultaneous metal-to-metal engagement of the flange 170 on the stop roll with the housing 57 positively stops the further movement of the turret slide since this metal-to-metal contact extends through the stop screw 94, slide 144 and latch 142 to the engaged tooth of the ratchet wheel which is connected with the rack pinion 102.

The apparatus is similarly set up for each of the other faces of the turret which are to be employed, thus setting the mechanism for cooperation with the corresponding stop screw 94. In this operation of setting up the subsequent stop screws, it will be remembered that the dial 82 will be left in the position shown in Figs. 2 and 14 with its "1-6" indicia in alignment with the arrow 181 so that the clutch member 62 remains in engagement with the clutch sleeve 60. Hence, when the turret is indexed to bring a new face into operative position, the cylindrical sleeve member 74 will be correspondingly rotated to bring the corresponding slot 76 thereof into alignment with its slot 76a in the outer sleeve 77 while the slot for the previously employed finger or element 130 will move out of alignment with its slot 76a in the sleeve 77. Therefore, the upper end of the previously used finger or element is now rocked so that its catch 134 can no longer enter a notch in its corresponding disc. The indexing of the turret has also operated, through the gears 79 and 90, to rotate the stop roll 93 thus bringing the stop screw 94 thereof, corresponding to the face of the turret to be used, into active position. The operator then sets the rotatable cam or disc 118 corresponding to the active finger and stop screw for the indexed position of the turret as previously described.

The operation for each succeeding face of the turret is the same as above described for the "number 1" face, for after the stopping mechanism has been initially set up it is only necessary to index the turret to its proper position and engage the feed control lever 35. The feeding movement of the turret slide will begin and continue until the slide has moved the predetermined distance for which the corresponding stop screw 94 has been set. When the desired predetermined stop position for the indexed face of the turret has almost been reached, the corresponding active finger 130 drops into the notch 135 of the corresponding disc 118 this causing the latch 142 to engage a tooth of the ratchet wheel and move the slide 144 into engagement with the active stop screw 94, and thereby move the flange 170 of the stop roll into engagement with the housing 57 with consequent disengagement of the feed control lever and positive stopping of the movement of the turret slide at the desired predetermined location. The turret slide is then moved backwardly sufficiently to clear the tools from the work, the turret is again indexed, the feed control lever again engaged, and the stop mechanism will automatically operate to stop the turret slide at the desired predetermined location for the next indexed turret face.

As mentioned above, the mechanism, when adjusted, will automatically positively stop the movement of the movable member or slide 29 at the various predetermined positions without further action upon the part of the operator. In the event that the feed control lever 35 should be knocked out slightly before the above described metal-to-metal contact occurs, as for example, due to wear of the pin 36 or bushing 37, the operator may bring the turret slide to the position where this metal-to-metal contact occurs by a slight rotation of the conventional turnstile or hand wheel 185. He may, however, obviate the necessity of operating the turnstile or hand wheel by adjusting the shaft 174 relative to shaft 91 at the adjustable connection 173 until the metal-to-metal contact again occurs at the same time that the feed control lever is knocked out.

When it is desired to employ a tool or tools upon a corner of the turret or upon the same face of the turret as that on which another tool is mounted, the mechanism is initially set up as follows: The operator first grasps the pull pin handle 84 and rotates the dial 82 approximately 120 degrees until the pin 85 enters the opening 88. This movement of the dial will have correspondingly rotated the cylindrical sleeve member 73 and the sleeve 77 to bring one of the slots 75, 75a therein into operative position with respect to one of the fingers 130. This rotation of the sleeve 77 will also have circumferentially displaced the openings 76a therein, corresponding with the openings 76 in the sleeve member 74, to such position that none of the corresponding fingers can enter therein. The cam 81 upon the sleeve 77 will have simultaneously actuated the pin 69 to move the rod 67 and its collar 66 to the left to the position shown in Fig. 15 thus disengaging the clutch member 62 from the clutch sleeve 60. This latter operation disconnects the operative connection between the turret 30 and the gears 79 and 90 of the stop mechanism so that the turret may now be freely turned without indexing the stop mechanism.

The operator will then manually turn the stop roll 93 to bring indicium "7" thereon into alignment with the arrow 180 thus bringing the corresponding stop screw 94 into active position, that is, into alignment with the end of the slide 144. He will then proceed to adjust the corresponding cam or disc 118 to position its notch 135 for engagement with the catch 134 of the finger 130, which was selected by the actuating of dial 82, when the movable member or slide 29 is positioned at its desired stopping point. This setting operation is effected as previously described, the screw 94 being adjusted as before to cause the stop roll to effect knock out of the feed control lever when the slide is at this stop position.

A similar operation may be effected for setting up the stop mechanism for a second special stop corresponding to a corner, or a previously used face of the turret, by again grasping the pull pin handle 84 and rotating the dial 82 approximately 120 degrees to align the indicium "8" thereon with the arrow 181 thereby engaging the pin 85 in the opening 89. This will again rotate the sleeves 73 and 77 bringing the other of their slots 75, 75a into cooperative relationship with a finger 130 and moving the previously used slots out of cooperation with the corresponding finger. As before, this setting of the dial 82 will have disengaged the indexing connection between the turret and the stop mechanism so that the operator may manually position the stop roll 93 to bring a new stop screw 94 into active position. He then adjusts the active screw and the corresponding disc 118 to effect stopping of the movable member or slide 29 and knock out of the feed control lever at the desired predetermined position.

These last two mentioned settings of the stop roll are for special operations and in order to restore the mechanism to its automatic indexing operation, after each use of such special stops, it is necessary to manually move the stop roll to align the stop, of the series marked "1" to "6" which is to be used next, with the arrow 180. The operator then turns the dial 82 to bring its indicia "1-6" into alignment with the arrow 181. For example, if one of the special stops "7" or "8" is used between regular stops such as "4" and "5," the operator will turn the stop roll to align the "5" stop with the arrow 180. When the turret is now moved to the "5" position the clutch member 62 will engage the clutch sleeve 60 re-establishing the indexing relationship between the turret, the stop roll and the slotted cylindrical sleeve 74 so that the stop mechanism is again effective to automatically stop the movable member 29 for each predetermined position of a given turret face by simply indexing the turret.

Figure 17:
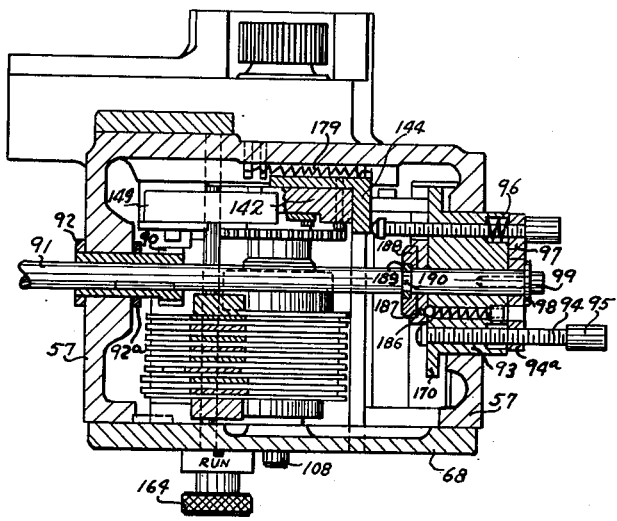
Fig. 17 is a sectional view taken substantially on the section line 17—17 of Fig. 7.
Figure 18:
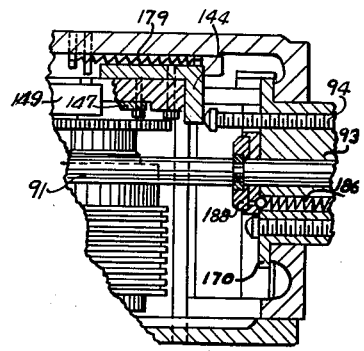
Fig. 18 is a fragmentary sectional view similar to Fig. 18 but showing a portion of the elements illustrated in Fig. 17 in a different operating position.

Referring to Fig. 17 it will be observed that the stop roll 93 is frictionally mounted upon the shaft 91 by means of the previously mentioned heavy spring detent 186 which engages one of a plurality of the openings 187 in the plate 188, the latter being retained upon the shaft 91 by means of the split washer 189 which cooperates with a recess in the plate 188 and a groove 190 on the rod 91. Hence, the stop roll 93 may be manually turned relative to the shaft 91 to bring any desired stop 94 into active position with respect to the slide 144 if desired.

An interlock is provided between the means for actuating the rapid motion mechanism, the feed control lever and the stop mechanism so that whenever the operator actuates the handle 50 to engage the rapid motion mechanism in either direction, the feed control lever 35 will be knocked out, thus disengaging the clutch in the feed drive, and the stop mechanism will also be rendered inoperative. This interlock comprises a second arm 192 integral with the rapid motion lever 49 and having a substantially V-shaped outer end extending into a correspondingly shaped V block 193 slidably mounted in a slot provided in the movable member or slide 29. This V block 193 (see Figs. 3 and 4) is connected with the rod 174 by means of spaced collars 194 and 195 which are pinned to the shaft 174. The pivotal mounting for the rapid motion lever 49 comprises a vertically extending rod 196 rotatably supported in the movable member or slide 29 and provided, adjacent its lower end, with a laterally extending arm 197, the arm being pinned to the rod 196. This arm 197 is shaped substantially the same as the arm 192 and cooperates in the same manner with a V block 198 slidably supported in a slotted opening in the slide or movable member 29, the lower surface of the block 189 being supported by a plate 199 attached to the member 29.

Figure 4:
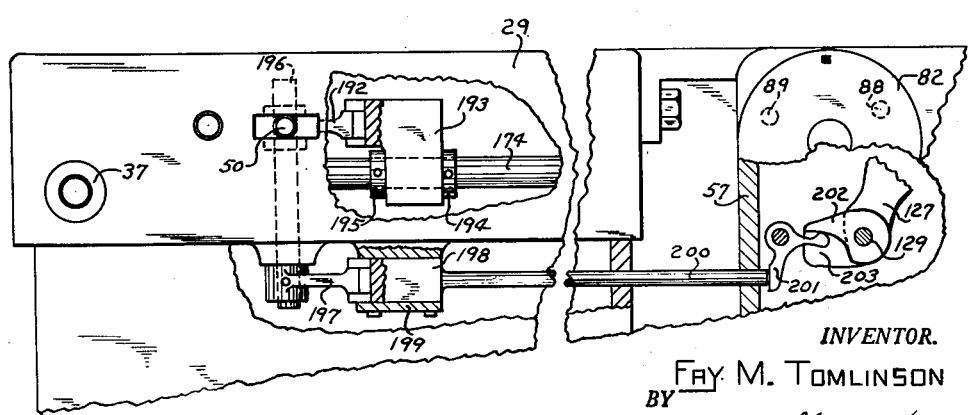
Fig. 4 is a fragmentary side elevational view of a portion of the turret slide and stop mechanism illustrated in Fig. 3 with parts broken away and others in section to more clearly show the interlock.

The rear of the V block 198 is connected with a rod 200, extending substantially parallel with the shafts 174 and 91, and passing through an opening in the side walls of the movable member 29 and of the housing 57 for the stop mechanism. Within the housing 57, closely adjacent the left side wall thereof as viewed in Figs. 4 and 7, is pivotally mounted a bell crank lever 201, the lower arm of which is engaged by the rod 200, the upper arm of the bell crank lever being adapted to engage an arm 202 formed integrally on the arm 127 of the counterweight member 126. This arm 202 is preferably formed with a recessed portion 203, the said second arm of the bell crank lever 201 engaged with the upper surface of the recessed portion when the counterweight member 126 is rocked to its extreme upper position as shown in Fig. 7, the bell crank lever 201 being out of engagement with the arm 202 when the counterweight member 126 has rocked to its lowermost position.

The construction of the interlock is such that, when the operator moves the handle 50 of the rapid motion lever 49 in either direction from its neutral position to engage the rapid motion mechanism, the arm 192 forces the V block 193 to the right as viewed in Figs. 3 and 4 thus moving the rod 174 in a direction which causes the feed lever 35 to be knocked out, thereby disengaging the clutch in the feed drive. Simultaneously, the arm 197 actuates its V block 198 moving the rod 200 to the right as viewed in Figs. 4 and 7 thus rocking the bell crank 201, the latter engaging the arm 202 and thereby rocking the counterweight member 126 from its uppermost to its lowermost position. This rocking of the counterweight member causes the projection 140 thereon to engage the rod 141 carried by the latch 142, thus disengaging the latch from the ratchet wheel 104 so that the slide or movable member 29 may be freely moved by the rapid motion mechanism.

In certain instances as previously mentioned, it may be desirable to omit the feed control lever and the disengageable clutch controlled thereby in the feeding drive for the movable member 29. In such a case the feed shaft 34 is connected to the feed pinion 33 through a friction clutch which will slip under a predetermined torque. The stop mechanism of this invention may be employed when the feed pinion is so actuated and will operate as above described except that the feed is not disconnected when the stop mechanism is operated to stop the member 29 at a predetermined position. That is to say, when the member 29 has moved to its predetermined location, actuating the latch 142 into engagement with the ratchet wheel and the active stop screw, the resulting metal-to-metal contact in the stop mechanism stops the rack pinion 102 so that the feeding movement of the member 29 is positively stopped, the friction clutch in the feed drive slipping until rotation of feed shaft is terminated, or the turret slide is returned to its former position and a new feeding movement permitted by indexing the turret to a new position. Likewise, the interlock may be employed with such a feed drive and will operate as above described except that the feed drive is not disengaged during the operation of the rapid motion mechanism.

Other modifications and adaptations may be made without departing from the invention. For example, while the invention has been described with reference to an attachment which is mounted upon a turret slide, it may be attached to or made integral with any other movable member of a machine tool to operate in its intended manner.

Therefore, while the preferred embodiment of the invention has been illustrated and described in considrable detail it is to be understood that the invention is not limited to the exact details of construction herein illustrated and described but only as required by the spirit and scope of the appended claims.

Having thus described the invention, I claim:

1. A machine tool of the character described comprising a support, a member movably mounted on said support and indexible relative thereto, said member being adapted to support a plurality of tools, means for moving said member along said support, and a unitary stop mechanism connected with said member for movement therewith along the support; said mechanism including rotatable means cooperating with said support for rotation by movement of said member and having a portion positively driven by said movement, positionable means positioned by indexing of said movable member, and means jointly controlled by said positionable means and said rotatable means engageable with the said positively driven portion of the latter and restrained from further movement by a rigid portion of said movable member when the latter has moved to a predetermined location along the support to stop the rotation of said rotatable means and thereby positively stop the movement of said movable member at said predetermined location.

2. A machine tool of the character described comprising a support, a member movably mounted on said support and indexible relative thereto, said member being adapted to support a plurality of tools, means for moving said member along said support, and a unitary stop mechanism connected with said member for movement therewith along the support; said mechanism including rotatable means cooperating with said support for rotation by movement of said member, positionable means positioned by the indexing of said movable member, and means jointly controlled by said positionable means and said rotatable means to disengage the means for moving said movable member when the latter has moved to a predetermined location along the support, and to substantially simultaneously stop the rotation of said rotatable means thereby positively stopping the movemen of said movable member at said predetermined location.

3. A machine tool of the character described comprising a bed, a slide mounted for movement along said bed, a tool supporting turret mounted on said slide for indexing relative thereto, a stationary rack on said bed, means cooperating with said rack for moving said slide along said bed, and a unitary stop mechanism carried by said slide; said mechanism including a pinion cooperatng with sad rack for rotation by movement of said slide, rotatable means connected for rotation with said pinion, positionable means, an operative connection between said turret and said positionable means for positioning the latter in accordance with the indexed position of the former, and means jointly controlled by said positionable means and said rotatable means to disengage the means for moving said slide when the latter has moved to a predetermined location along the bed and to substantially simultaneously stop the rotation of said pinion thereby stopping the movement of said slide and turret at said predetermined location.

4. A machine tool of the character described comprising a support, a member movably mounted on said support and indexible relative thereto, said member being adapted to support a plurality of tools, means for moving said member along said support, and a unitary stop mechanism connected with said member for movement therewith along said support; said mechanism including rotatable means cooperating with said support for rotation by movement of said member, positionable means, an operative connection between said movable member and said positionable means for positioning the latter in accordance with the indexing movement of the former to any of its normal indexed positions, means jointly controlled by said positionable means and said rotatable means to disengage the means for moving said movable member when the latter has moved to a predetermined location along the support and to substantially simultaneously stop the rotation of said rotatable means thereby stopping the movement of said movable member at said predetermined location, and means to disengage the operative connection between said movable member and said positionable means and to simultaneously move a portion of said positionable means to a different position thereby rendering said stop mechanism effective to terminate movement of said movable member when the latter has moved to a predetermined location along said support for any additional desired indexed position of said movable member.

5. A machine tool of the character described comprising a support, a member movably mounted on said support and indexible relative thereto, said member being adapted to support a plurality of tools, means for moving said member along said support, and a unitary stop mechanism connected with said member for movement therewith along the support; said mechanism including rotatable means cooperating with said support for rotation by movement of said member and having a portion positively driven by said movement, positionable means positioned by the indexing of said movable member, a plurality of movable elements cooperating with said positionable means, said positionable means being so constructed that the positioning thereof automatically selects one of said elements for cooperative relationship with said rotatable means, and means adapted to engage the said positively driven portion of said rotatable means and a rigid portion of said movable member under the control of said one of said elements and the said rotatable means when said movable member has moved to a predetermined location along the support to stop the rotation of said rotatable means thereby stopping the movement of said movable member at said predetermined location.

6. A machine tool of the character described comprising a support, a member movably mounted on said support and indexible relative thereto, said member being adapted to support a plurality of tools, means for moving said member along said support, and a unitary stop mechanism connected with said member for movement therewith along the support; said mechanism including rotatable means cooperating with said support for rotation by movement of said member, positionable means positioned by the indexing of said movable member, a plurality of movable elements cooperating with said positionable means, said positionable means being so constructed that the positioning thereof automatically selects one of said elements for cooperative relationship with said rotatable means, and means adapted to engage a portion of said rotatable means under the control of said one of said elements and the said rotatable means when said movable member has moved to a predetermined location along said support thereby disengaging the means for moving said member and substantially simultaneously stopping the rotation of said rotatable means to stop the movement of said movable member at said predetermined location.

7. A machine tool of the character described comprising a bed, a slide mounted for movement along said bed, a tool supporting turret mounted on said slide for indexing relative thereto, a stationary rack on said bed, means cooperating with said rack for moving said slide along said bed, and a unitary stop mechanism carried by said slide; said mechanism including a pinion cooperating with said rack for rotation by movement of said slide, rotatable means connected for rotation with said pinion, positionable means, an operative connection between said turret and said positionable means for positioning the latter in accordance with the indexed position of the former, a plurality of movable elements cooperating with said positionable means, said positionable means being so constructed that the positioning thereof automatically selects one of said elements for cooperation with said rotatable means, means for engaging a portion of said rotatable means under the control of said one of said elements and the said rotatable means when the slide has moved a predetermined distance along said bed, and means actuated by the said engagement of the last-mentioned means with said rotatable means to disengage the means for moving said slide and to substantially simultaneously stop the rotation of said pinion thereby stopping the movement of said slide at a desired predetermined location.

8. A machine tool of the character described in claim 7 and in which said stop mechanism further includes means to disengage the operative connection between said turret and said positionable means and to move the latter to select a different one of said movable elements for cooperation with said rotatable means whereby said stop mechanism is rendered effective to stop the movement of said slide at a desired predetermined location regardless of the position of said turret so that said stop mechanism may be employed with any face of the turret or with a corner thereof intermediate any two adjacent faces.

9. A machine tool of the character described comprising a support, a member movably mounted on said support and indexible relative thereto, said member being adapted to support a plurality of tools, means for moving said member along said support, and a unitary stop mechanism connected with said member for movement therewith along the support; said mechanism including rotatable means cooperating with said support for rotation by movement of said member, a plurality of adjustable stops, positionable means positioned by indexing of said movable member, an operative connection between said positionable means and said adjustable stops to selectively position one of said stops in active position when said movable member is indexed, a plurality of movable elements cooperating with said positionable means, said positionable means being so constructed that the positioning thereof by indexing of the movable member automatically selects one of said elements for cooperation with said rotatable means, and means adapted to engage a portion of said rotatable means and said active stop under the control of said one of said elements and rotatable means when the movable member has moved to a predetermined location along the support thereby disengaging the means for moving said member and substantially simultaneously stopping the rotation of said rotatable means to stop the movement of said movable member at said predetermined location.

10. A machine tool of the character described comprising a bed, a slide mounted for movement along said bed, a tool supporting turret mounted on said slide for indexing relative thereto, a stationary rack on said bed, means cooperating with said rack for moving said slide along said bed, and a unitary stop mechanism carried by said slide for movement therewith; said mechanism including a pinion cooperating with said rack for rotation by movement of said slide, rotatable means connected for rotation with said pinion, positionable means, a plurality of adjustable stops, means operative connecting said turret with said positionable means and said adjustable stops to selectively position said positionable means and said stops when said turret is indexed, a plurality of movable elements cooperating with said positionable means, said positionable means being so constructed that the said selective positioning thereof automatically selects one of said elements for cooperation with said rotatable means, means for engaging a portion of said rotatable means and one of the stops under the control of said one of said elements and rotatable means when the slide has moved a predetermined distance along said bed, and means actuated by the said engagement of the last-mentioned means with said rotatable means to disengage the means for moving said slide and to substantially simultaneously stop the rotation of said pinion thereby stopping the movement of said slide at a desired predetermined location.

11. A machine tool of the character described in claim 10 and in which said stop mechanism further includes means to disengage the operative connection between said turret and said positionable means and to move the latter to a different position thereof thereby selecting a different one of said movable elements for cooperation with said rotatable means, and means permitting adjustment of said stop means independently of said positionable means whereby said stop mechanism is rendered effective to stop the movement of said slide at a desired predetermined location regardless of the position of said turret so that said stop mechanism may be employed with any face of the turret or with a corner thereof intermediate any two adjacent faces.

12. A machine tool of the character described comprising a support, a member movably mounted on said support and indexible relative thereto, said member being adapted to support a plurality of tools, means for moving said member along said support, and a unitary stop mechanism connected with said member for movement therewith along the support; said mechanism including rotatable means cooperating with said support for rotation by movement of said member, a plurality of rotatable cams connected for rotation with said rotatable means, a plurality of adjustable stops, positionable means positioned by indexing of said movable member, an operative connection between said positionable means and said adjustable stops to selectively position one of said stops in active position when said movable member is indexed, a plurality of movable elements cooperating with said positionable means, said positionable means being so constructed that the positioning thereof automatically selects one of said elements for cooperative relationship with a corresponding one of said rotatable cams, and means adapted to engage a portion of said rotatable means and said active stop under the control of said one of said elements and said rotatable cams when the movable member has moved to a predetermined location along the support thereby disengaging the means for moving said member and substantially simultaneously stopping the rotation of said rotatable means to stop the movement of said movable member at said predetermined location.

13. A machine tool of the character described comprising a support, a member movably mounted on said support and indexible relative thereto, said member being adapted to support a plurality of tools, means for moving said member along said support, and a unitary stop mechanism connected with said member for movement therewith along the support; said mechanism including rotatable means cooperating with said support for rotation by movement of said member, a plurality of rotatable cams connected for rotation with said rotatable means, a plurality of adjustable stops, positionable means positioned by indexing of said movable member, an operative connection between said positionable means and said adjustable stops to selectively position one of said stops in active position when said movable member is indexed, a plurality of movable elements cooperating with said positionable means, said positionable means being so constructed that the positioning thereof by indexing of the movable member automatically selects one of said elements for cooperation with a corresponding one of said rotatable cams, a ratchet wheel connected with said rotatable means for rotation therewith, and means adapted to engage said ratchet wheel and said active stop under the control of said one of said elements and said rotatable cams when the movable member has moved a predetermined distance along the support thereby disengaging the means for moving said member and substantially simultaneously stopping the rotation of said rotatable means to stop the movement of said movable member at a predetermined location.

14. A machine tool of the character described comprising a support, a member movably mounted on said support and indexible relative thereto, said member being adapted to support a plurality of tools, means for moving said member along said support, and a unitary stop mechanism connected with said member for movement therewith along the support; said mechanism including rotatable means cooperating with said support for rotation by movement of said member, a plurality of rotatable cams connected for rotation with said rotatable means, a plurality of adjustable stops, positionable means positioned by indexing of said movable member, an operative connection between said positionable means and said adjustable stops to selectively position one of said stops in active position when said movable member is indexed, a plurality of movable elements cooperating with said positionable means, said positionable means being so constructed that the positioning thereof by indexing of the movable member automatically selects one of said elements for cooperation with a corresponding one of said rotatable cams, a ratchet wheel connected with said rotatable means for rotation therewith, and a latch means adapted to engage said ratchet wheel and said active stop under the control of said one of said elements and rotatable cams when the movable member has moved a predetermined distance along the support thereby disengaging the means for moving said member and substantially simultaneously stopping the rotation of said rotatable means to stop the movement of said movable member at a predetermined location.

15. A machine tool of the character described comprising a support, a member movably mounted on said support and indexible relative thereto, said member being adapted to support a plurality of tools, means for moving said member along said support, and a unitary stop mechanism connected with said member for movement therewith along the support; said mechanism including rotatable means cooperating with said support for rotation by movement of said member, a plurality of rotatable cams connected for rotation with said rotatable means, a plurality of adjustable stops, positionable means positioned by indexing of said movable member, an operative connection between said positionable means and said adjustable stops to selectively position one of said stops in active position when said movable member is indexed, a plurality of movable elements cooperating with said positionable means, said positionable means being so constructed that the positioning thereof by indexing of the movable member automatically selects one of said elements for cooperation with a corresponding one of said rotatable means, a ratchet wheel connected with said rotatable means for rotation therewith, a latch adapted to engage said ratchet wheel under the control of said one of said elements and rotatable cams when the movable member has moved a predetermined distance along the support, a slide connected with said latch and actuated by engagement of the latter with said ratchet wheel to move said slide into engagement with said active stop, and means actuated by the engagement of said slide with said stop to disengage the means for moving said member and substantially simultaneously stop the rotation of said rotatable means thereby stopping the movement of said movable member at a predetermined location.

16. A machine tool of the character described comprising a support, a member movably mounted on said support and indexible relative thereto, said member being adapted to support a plurality of tools, means for moving said member along said support, and a unitary stop mechanism connected with said member for movement therewith along the support; said mechanism including rotatable means cooperating with said support for rotation by movement of said member, a plurality of rotatable cams connected for rotation with said rotatable means, a stop roll having a plurality of adjustable stops and mounted for rotation and axial movement, positionable means positioned by indexing of said movable member, an operative connection between said positionable means and said stop roll to selectively rotate said stop roll for positioning one of said stops in active position when said movable member is indexed, a plurality of movable elements cooperating with said positionable means, said positionable means being so constructed that the positioning thereof by indexing of the movable member automatically selects one of said elements for cooperation with a corresponding one of said rotatable cams, a ratchet wheel connected with said rotatable means for rotation therewith, a latch adapted to engage said ratchet wheel under the control of said one of said elements and rotatable cams when the movable member has moved a predetermined distance along the support, a slide connected with said latch and actuated by engagement of the latter with said ratchet wheel to move said slide into engagement with said active stop, further rotation of said ratchet wheel causing said slide to axially move said stop and said stop roll, and means connected with said stop roll and actuated by said axial movement of the latter to disengage the means for moving said member along said support at a predetermined location thereof, the said stop roll substantially simultaneously moving into contact with a stationary portion of the stop mechanism to positively stop the rotation of said ratchet wheel and said rotatable means thereby stopping the movement of the movable member at said predetermined location.

17. A machine tool of the character described comprising a support, a member movably mounted on said support and indexible relative thereto, said member being adapted to support a plurality of tools, a stationary rack on said support, means cooperating with said rack, for moving said member along said support, and a unitary stop mechanism connected with said member for movement therewith along the support; said mechanism including a pinion cooperating with said rack for rotation by movement of said member, a ratchet wheel connected with said pinion for rotation therewith, a stop roll having a plurality of adjustable stops, a positionable member having a plurality of axially and circumferentially spaced slots in its periphery, means operatively connected with said movable member for positioning said stop roll and said positionable member when said movable member is indexed, a plurality of notched disks connected for rotation with said ratchet wheel and rotatably adjustable relative thereto, a plurality of movable elements, each provided with a catch portion and each mounted to cooperate with an individual disk and with a corresponding slot in said positionable member, means to adjust each of said disks to align the notch therein with the catch portion of the corresponding element at a predetermined position in the movement of said movable member, a movable slide adapted to engage a positioned stop on said stop roll, a latch pivoted to said slide and adapted to engage the teeth of the ratchet wheel when one of said elements engages in a slot in said positionable member and in the notch in the corresponding disk, further rotation of said ratchet wheel causing said slide to axially move said stop screw and said stop roll, and means connected with said stop roll and actuated by the said axial movement of the latter to disengage the feeding means for said movable member at a predetermined location thereof, the stop roll substantially simultaneously moving into contact with a stationary portion of the stop mechanism to stop the rotation of said ratchet wheel and the said pinion thereby stopping the movement of the movable member at said predetermined location.

18. A machine tool of the character described comprising a support, a tool supporting member movably mounted on said support, means for moving said member along said support, and a unitary stop mechanism carried by said member; said mechanism including rotatable means cooperating with said support for rotation by movement of said member and having a portion positively driven by said movement, selectively positionable means, a plurality of adjustable stops, an operative connection between said positionable means and said adjustable stops to selectively position one of said stops in active position in accordance with the position of said positionable means, and means including a part adapted to engage both the said positively driven portion of said rotatable means and said active stop under the control of said positionable means and said rotatable means when the tool supporting member has moved a predetermined distance along the support to positively stop the rotation of said rotatable means and thereby stop the movement of said tool supporting member at a predetermined location.

19. A machine tool of the character described comprising a support, a tool supporting member movably mounted on said support, means for moving said member along said support, and a unitary stop mechanism carried by said member; said mechanism including rotatable means cooperating with said support for rotation by movement of said member, selectively positionable means, a plurality of adjustable stops, an operative connection between said positionable means and said adjustable stops to selectively position one of said stops in active position in accordance with the position of said positionable means, and means adapted to engage a portion of said rotatable means and said active stop under the control of said positionable means and said rotatable means when the tool supporting member has moved a predetermined distance along the support to thereby disengage the means for moving said member and substantially simultaneously stop the rotation of said rotatable means with consequent stopping of the movement of said tool supporting member at a predetermined location.

20. A machine tool of the character described comprising a support, a tool supporting member movably mounted on said support, means for moving said member along said support, and a unitary stop mechanism carried by said member; said mechanism including rotatable means cooperating with said support for rotation by movement of said member, selectively positionable means, a plurality of adjustable stops, an operative connection between said positionable means and said adjustable stops to selectively position one of said stops in active position in accordance with the position of said positionable means, a plurality of movable elements cooperating with said positionable means, said positionable means being so constructed that the positioning thereof automatically selects one of said elements for cooperation with said rotatable means, and means adapted to engage a portion of said rotatable means and said active stop under the control of said one of said elements and rotatable means when the tool supporting member has moved a predetermined distance along the support to thereby disengage the means for moving said member and to substantially simultaneously stop the rotation of said rotatable means with consequent stopping of the movement of said tool supporting member at a predetermined location.

21. A machine tool of the character described comprising support; a tool supporting member movably mounted on said support; means including a feed control lever for moving said member along said support at a feeding rate; means including a rapid motion control lever for moving said member along said support at a relatively rapid rate; a unitary stop mechanism connected with said member for movement therewith including a rotatable means cooperating with said support for rotation by movement of said member and having a portion positively driven by said movement, a positionable means, means jointly controlled by said positionable means and said rotatable means to disengage the said feed control lever thereby discontinuing the feeding movement of said member when the latter has moved to a predetermined location along the support, the said jointly controlled means having a part engageable with the said positively driven portion of said rotatable means to substantially simultaneously stop the rotation of said rotatable means with consequent positive stopping of the movement of said movable member at said predetermined location; and an interlock means including operative connections between said rapid motion lever, said feed control lever and said jointly controlled means of the stop mechanism such that actuation of said rapid motion lever for effecting the relatively rapid motion of the movable member during a feeding movement thereof acts through said operative connections to simultaneously disengage said feed control lever and prevent engagement of the said part of the said jointly controlled means of said stop mechanism with the positively driven portion of the latter.

22. A machine tool of the character described comprising a support, a tool supporting member movably mounted on said support, means for moving said member along said support at a feeding rate, means including a rapid motion control lever for moving said member along said support at a relatively rapid rate, a stopping mechanism carried by said member and including a rotatable member positively driven by movement of said supporting member, means engageable with said rotatable member and a rigid portion of said tool supporting member to prevent rotation of said rotatable member thereby stopping the feeding movement of said tool supporting member at one or more predetermined locations along said support, and interlocking means between said rapid motion lever and the said engageable means for holding the latter from engagement with the rotatable member when the said rapid motion lever is actuated for effecting rapid motion of said tool supporting member.

23. A machine tool of the character described in claim 22 and wherein the said means for moving the tool supporting member at a feeding rate includes a feed control lever and the said interlocking means further comprises an operative connection between the said rapid motion lever and said feed control lever such that actuation of the rapid motion lever for effecting rapid movement of the tool supporting member during a feeding movement thereof automatically disengages the said feed control lever.

FAY M. TOMLINSON.

REFERENCES CITED

The following references are of record in the file of this patent:

UNITED STATES PATENTS

| Number | Name | Date |
|---|---|---|
| 1,113,223 | Le Blond et al. | Oct. 13, 1914 |
| 1,708,010 | Class | Apr. 9, 1929 |
| 1,709,118 | Class | Apr. 16, 1929 |
| 2,056,792 | Lovely | Oct. 6, 1936 |
| 2,094,995 | Lovely | Oct. 5, 1937 |
| 2,189,482 | Van Hammersveld | Feb. 6, 1940 |